UNITED STATES PATENT OFFICE.

IRENE L. ROGERS, OF SPRINGFIELD, MASSACHUSETTS.

IMPROVEMENT IN PROCESSES OF SKELETONIZING LEAVES.

Specification forming part of Letters Patent No. 211,054, dated December 17, 1878; application filed November 23, 1877.

*To all whom it may concern:*

Be it known that I, IRENE L. ROGERS, of Springfield, Hampden county, Commonwealth of Massachusetts, have invented new and useful Improvements in Ornamental Leaves, Flowers, Ferns, &c., for millinery and other ornamental purposes, of which the following is a specification, in which the process of manufacture is set out.

This invention relates to ornaments made from the fibrous parts of leaves, flowers, ferns, &c., after having the vegetable matter removed.

The process of manufacture is as follows: I gather the leaves or other matter at any season of the year when the fiber has become toughened. As the treatment of ferns differs somewhat from the treatment of other matter, I proceed to describe this first. I make a solution of equal parts each of chlorate of soda and rain-water, (Leapree's chlorate of soda gives the best result,) place the ferns in a glass vessel, and cover with the above solution. Set the vessel in the sunlight, if possible, though a very good result may be had by applying artificial heat. After remaining about four hours, remove and immerse in soft water to remove the soda.

In treating leaves, flowers, seed-vessels, &c., I take from one to two gallons of rain-water and add about one tea-spoonful of muriatic acid; place the leaves, &c., in a jar loosely, and cover with the above liquid; set in a warm place (the heat of the sun is preferable) until the vegetable matter is softened and easily removed. This time varies. With the softer varieties one week is sufficient, while with others six months may be required to complete the process. I use a soft brush to remove the vegetable matter from the fiber. The fiber is then bleached in the following manner: Make a solution of one-fourth pound chlorate of lime to about eight quarts of rain-water; place the fibrous matter loosely in a glass vessel, cover with the above, and expose to the light until the fiber becomes thoroughly bleached. This usually takes about three hours. A strong sunlight gives the best result. After which the fiber should be soaked in soft water to remove the lime and foreign matter. The fibrous matter, after being colored in the ordinary way, is made into bunches or used separately for millinery or other ornamental purposes.

Having therefore described my invention, what I claim, and desire to secure by Letters Patent, is—

1. In the process of preparing leaves, flowers, seed-vessels, &c., for skeletonizing, the separation of the vegetable and fibrous material of the leaves by first softening in muriatic acid and water and subjecting to heat, and afterward removing the vegetable matter, substantially as and in the manner set forth.

2. The process of treating ferns for skeletonizing by first immersing in a solution of chloride of soda and water and subjecting to heat, then freeing the ferns from the soda by immersion in soft water, substantially as and in the manner set forth.

IRENE L. ROGERS.

Witnesses:
ALLEN WEBSTER,
LESTER NOBLE.